US012567929B2

(12) United States Patent
Tian et al.

(10) Patent No.: US 12,567,929 B2
(45) Date of Patent: Mar. 3, 2026

(54) METHOD FOR SRS TRANSMISSION RESOURCE CONFIGURATION, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jiejiao Tian, Guangdong (CN); Wenhong Chen, Guangdong (CN); Zhihua Shi, Guangdong (CN); Yingpei Huang, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 377 days.

(21) Appl. No.: 18/347,200

(22) Filed: Jul. 5, 2023

(65) Prior Publication Data

US 2023/0353307 A1 Nov. 2, 2023

Related U.S. Application Data

(63) Continuation of application No. PCT/CN2021/072569, filed on Jan. 18, 2021.

(51) Int. Cl.
*H04L 5/00* (2006.01)
*H04W 72/0453* (2023.01)

(52) U.S. Cl.
CPC .......... *H04L 5/0048* (2013.01); *H04L 5/0012* (2013.01); *H04W 72/0453* (2013.01)

(58) Field of Classification Search
CPC ... H04L 5/0048; H04L 5/0012; H04L 5/0007; H04L 5/0094; H04L 5/0051; H04W 72/0453
See application file for complete search history.

(56) References Cited

U.S. PATENT DOCUMENTS

2013/0100896 A1 4/2013 Chen et al.
2016/0338050 A1 11/2016 Kim et al.
(Continued)

FOREIGN PATENT DOCUMENTS

CN 101771463 7/2010
CN 110546913 12/2019
(Continued)

OTHER PUBLICATIONS

CNIPA, First Office Action for CN Application No. 202180089834. 2, Aug. 6, 2024.
CNIPA, Second Office Action for CN Application No. 202180089834. 2, Nov. 5, 2024.
"3rd Generation Partnership Project; Technical Specification Group Radio Access Network; NR; Physical channels and modulation (Release 15)," 3GPP TS 38.211, Dec. 2019, v15.8.0.
(Continued)

*Primary Examiner* — Yu-Wen Chang
(74) *Attorney, Agent, or Firm* — Hodgson Russ LLP

(57) ABSTRACT

Implementations of the disclosure provide a method for sounding reference signal (SRS) transmission resource configuration, a terminal device, and a network device. The method includes the following. A terminal device receives first information transmitted by a network device, where the first information indicates a frequency-domain position of a first SRS resource or a frequency-domain position of a second SRS resource, and the second SRS resource is an SRS resource for cross-subband transmission. The terminal device transmits the first SRS resource or the second SRS resource to the network device according to the first information.

9 Claims, 5 Drawing Sheets

(56) References Cited

U.S. PATENT DOCUMENTS

| | | | | |
|---|---|---|---|---|
| 2020/0014515 A1* | 1/2020 | Qin | ...................... | H04L 5/0051 |
| 2021/0391963 A1* | 12/2021 | Abdelghaffar | ........ | H04W 72/20 |
| 2022/0321302 A1* | 10/2022 | Wang | ................... | H04L 5/0051 |
| 2022/0353124 A1 | 11/2022 | Wang | | |
| 2023/0239088 A1* | 7/2023 | Gao | ...................... | H04L 5/0051 |
| | | | | 370/329 |
| 2023/0246792 A1* | 8/2023 | Wang | ................... | H04L 5/0051 |
| | | | | 370/329 |
| 2024/0171427 A1* | 5/2024 | Jiang | ................ | H04W 72/0446 |

FOREIGN PATENT DOCUMENTS

| | | |
|---|---|---|
| CN | 110831162 | 2/2020 |
| CN | 110831198 | 2/2020 |
| CN | 111277389 | 6/2020 |
| WO | 2020227889 | 11/2020 |

OTHER PUBLICATIONS

"3rd Generation Partnership Project; Technical Specification Group Radio Access Network; NR; Multiplexing and channel coding (Release 15)," 3GPP TS 38.212, Dec. 2019, v15.8.0.

"3rd Generation Partnership Project; Technical Specification Group Radio Access Network; NR; Physical layer procedures for data (Release 15)," 3GPP TS 38.214, Dec. 2019, v15.8.0.

Qualcomm Incorporated, "Discussion on SRS enhancement," 3GPP TSG-RAN WG1 Meeting #103-e, R1-2009255, Oct. 2020.

WIPO, International Search Report and Written Opinion for International Application No. PCT/CN2021/072569, Sep. 29, 2021.

EPO, Extended European Search Report for EP Application No. 21918702.8, Jan. 25, 2024.

* cited by examiner

TERMINAL
DEVICE

NETWORK
DEVICE

501. SECOND INFORATION

502. DETERMINE THE
CONFIGURATION INFORMATION OF
THE SRS RESOURCE SET ACCORDING
TO THE SECOND INFORMATION

503. FIRST INFORMATION

504. DETERMINE THE FREQUENCY-
DOMAIN POSITION OF THE SECOND
SRS RESOURCE ACCORDING TO THE
FIRST INFORMATION

505. TRANSMIT THE SECOND SRS
RESOURCE ACCORDING TO THE
FIRST INFORMATION

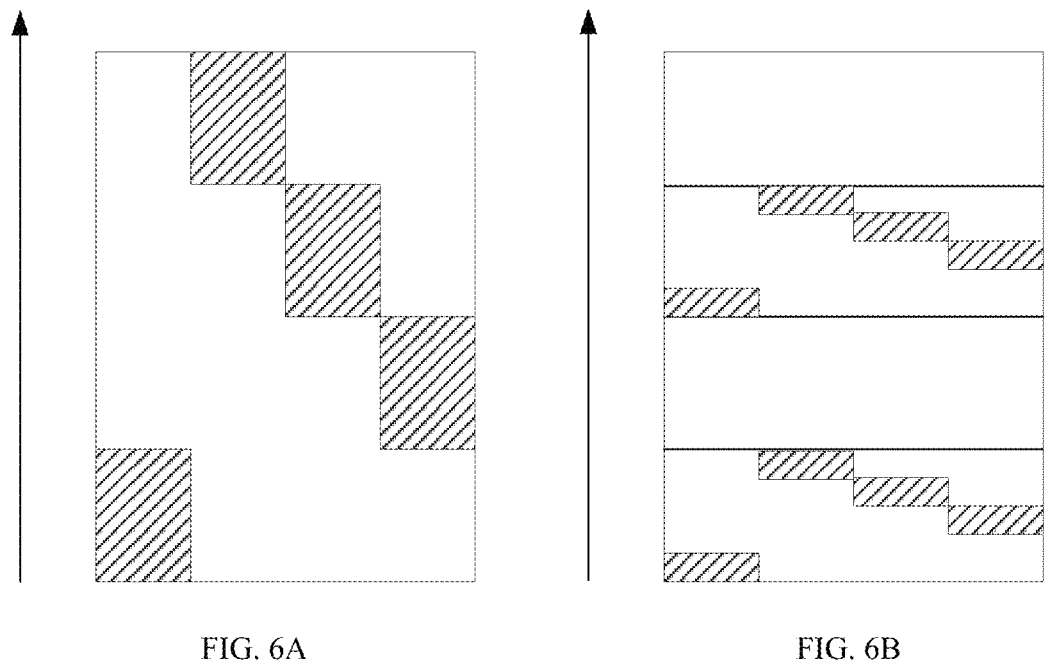
FIG. 6A                                    FIG. 6B
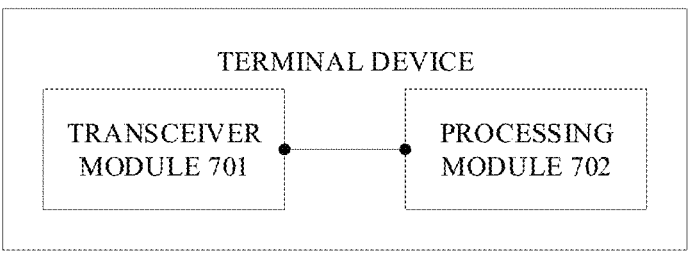
FIG. 7
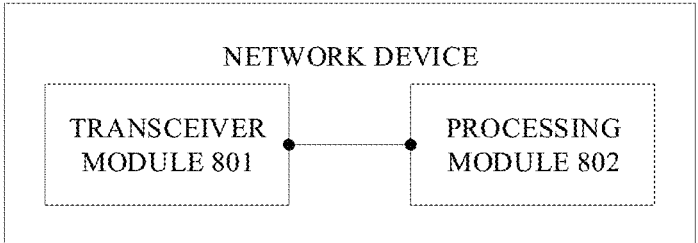
FIG. 8

METHOD FOR SRS TRANSMISSION RESOURCE CONFIGURATION, TERMINAL DEVICE, AND NETWORK DEVICE

CROSS REFERENCE TO RELATED APPLICATION(S)

This application is a continuation of International Application No. PCT/CN2021/072569, filed Jan. 18, 2021, the entire disclosure of which is incorporated herein by reference.

TECHNICAL FIELD

The disclosure relates to the field of communication, and more particularly, to a method for sounding reference signal (SRS) transmission resource configuration, a terminal device, and a network device.

BACKGROUND

According to configurations in current protocols, the network device configures bandwidth and frequency hopping parameters for each sounding reference signal (SRS) resource. The SRS resource is transmitted in a configured bandwidth. If a frequency-domain position or a bandwidth size of a channel detected by an SRS needs to be changed at a next moment, the frequency-domain position or the bandwidth size needs to be configured via a radio resource control (RRC). Moreover, considering that proximity bandwidths have similar channel conditions, a cross-subband SRS is introduced to detect channels in different frequency bands, so that a larger channel bandwidth can be detected under the same condition. However, there is no relevant scheme supported in the related art.

SUMMARY

A first aspect of implementations of the disclosure provides a method for SRS transmission resource configuration. The method may include the following. A terminal device receives first information transmitted by a network device, where the first information indicates a frequency-domain position of a first SRS resource or a frequency-domain position of a second SRS resource, and the second SRS resource is an SRS resource for cross-subband transmission. The terminal device transmits the first SRS resource or the second SRS resource to the network device according to the first information.

A second aspect of implementations of the disclosure provides a terminal device. The terminal device includes a memory configured to store executable program codes and a transceiver coupled with the memory and configured to: receive first information transmitted by a network device, where the first information indicates a frequency-domain position of a first SRS resource or a frequency-domain position of a second SRS resource, and the second SRS resource is an SRS resource for cross-subband transmission; and transmit the first SRS resource or the second SRS resource to the network device according to the first information.

A third aspect of implementations of the disclosure provides a network device. The network device includes a memory configured to store executable program codes and a transceiver coupled with the memory and configured to: transmit first information to a terminal device, where the first information indicates a frequency-domain position of a first SRS resource or a frequency-domain position of a second SRS resource, and the second SRS resource is an SRS resource for cross-subband transmission; and receive the first SRS resource or the second SRS resource transmitted by the terminal device according to the first information.

Other features and aspects of the disclosed features will become apparent from the following detailed description, taken in conjunction with the accompanying drawings, which illustrate, by way of example, the features in accordance with implementations of the disclosure. The summary is not intended to limit the scope of any implementations described herein.

BRIEF DESCRIPTION OF THE DRAWINGS

FIG. 6A is a schematic diagram illustrating positions of Q bandwidth segments indicated by a network device via a bitmap in implementations of the disclosure.

FIG. 6B is a schematic diagram illustrating a frequency-domain position where a terminal device transmits an SRS resource in implementations of the disclosure.

FIG. 7 is a schematic diagram of an implementation of a terminal device in implementations of the disclosure.

FIG. 8 is a schematic diagram of an implementation of a network device in implementations of the disclosure.

DETAILED DESCRIPTION

Figure 1A:
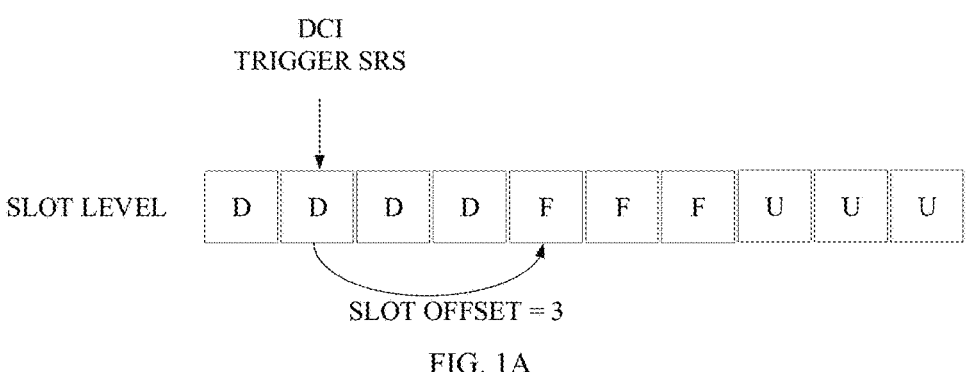
FIG. 1A is a schematic diagram illustrating SRS resource transmission.

The following will describe technical solutions of implementations of the disclosure with reference to the accompanying drawings. Apparently, implementations described herein are merely some implementations, rather than all implementations, of the disclosure. Based on the implementations described herein, all other implementations obtained by those of ordinary skill in the art without creative effort shall fall within the protection scope of the disclosure.

A brief description of relevant backgrounds involved in the disclosure is given below.

1. Sounding Reference Signal (SRS)

The SRS signal is an important reference signal in 5th generation (5G)/new radio (NR) systems and is widely used in various functions in the NR system, for example:

(1) for downlink (DL) channel state information (CSI) acquisition (UE sounding procedure for DL CSI acquisition);

(2) for uplink (UL) beam management;

(3) for positioning functions;

(4) for cooperating with codebook-based UL transmission, including frequency-domain scheduling and rank/precoding matrix indicator (PMI)/modulation coding scheme (MCS) determination; and (5) for cooperating with non-codebook based UL transmission, including frequency-domain scheduling and SRS resource indicator (SRI)/MCS determination.

A network can configure one or more SRS resource sets for user equipment (UE), and each SRS resource set can be configured with one or more SRS resources.

where $T_{SRS}$ is the configured period, $T_{offset}$ is the configured offset, $n_f$ is a serial number of a radio frame, and $n_{s,f}^{\mu}$ is a serial number of a slot.

(2) Aperiodic SRS Transmission

With the introduction of aperiodic SRS transmission in the NR system, the base station can trigger SRS transmission at the terminal via UL or DL downlink control information (DCI). A trigger signaling for triggering the aperiodic SRS transmission can be carried by a DCI used to schedule a physical uplink share channel (PUSCH)/physical downlink share channel (PDSCH) in a UE-specific search space, or by a DCI format 2_3 in a common search space. The DCI format 2_3 can be used to trigger the aperiodic SRS transmission and configure a transmission power control (TPC) command for a group of UEs or SRSs on a group of carriers.

TABLE 1

| SRS trigger signaling | |
|---|---|
| Value of SRS request field | Triggered aperiodic SRS resource set(s) for DCI format 0_1, 1_0, and 2_3 configured with higher layer parameter srs-TPC-PDCCH-Group set to 'typeB' |
| 00 | No aperiodic SRS resource set triggered |
| 01 | SRS resource set(s) configured with higher layer parameter aperiodicSRS-ResourceTrigger set to 1 |
| 10 | SRS resource set(s) configured with higher layer parameter aperiodicSRS-ResourceTrigger set to 2 |
| 11 | SRS resource set(s) configured with higher layer parameter aperiodicSRS-ResourceTrigger set to 3 |

The transmission of the SRS can be classified into periodic transmission, semi-persistent transmission, and aperiodic transmission, as detailed below.

(1) Periodic SRS and Semi-Persistent SRS

The periodic SRS refers to a periodically transmitted SRS, and a period and a slot offset of the periodic SRS are configured by a radio resource control (RRC) signaling. The terminal transmits the SRS at a certain period upon receiving a corresponding configuration parameter, until the RRC configuration fails. Spatial relation information (i.e., spatial relation info) of the periodic SRS, which implicitly indicates a transmit beam, is also configured by the RRC signaling. The spatial relation information may indicate a channel state information reference signal (CSI-RS), a synchronization signal block (SSB), or a reference SRS. The terminal determines a transmit beam of a third SRS resource according to a receive beam of the indicated CSI-RS/SSB or a transmit beam of a reference SRS resource.

The semi-persistent SRS is also a periodically transmitted SRS, a period and a slot offset of the semi-persistent SRS are configured by an RRC signaling, while an activation signaling and a deactivation signaling of the semi-persistent SRS are carried by a media access control-control element (MAC CE). The terminal starts transmitting the SRS periodically upon receiving the activation signaling, until the terminal receives the deactivation signaling. Spatial relation information (for example, a transmit beam) of the semi-persistent SRS is also carried by the MAC CE that activates the SRS.

After receiving the period and the slot offset configured by the RRC, the terminal determines a slot available for transmitting the SRS according to the following formula (1):

$$(N_{slot}^{frame,\mu} n_f + n_{s,f}^{\mu} - T_{offset}) \bmod T_{SRS} = 0 \qquad \text{formula (1)},$$

After receiving an aperiodic SRS trigger signaling (e.g., a DCI), the terminal performs SRS transmission on an SRS resource set indicated by the trigger signaling. A slot offset between the trigger signaling and the SRS transmission is configured by a higher layer signaling (for example, an RRC). The network side indicates in advance via a higher layer signaling to the terminal configuration parameters of each SRS resource set, including a time-frequency resource, a sequence parameter, a power control parameter, etc. In addition, for each SRS resource in the triggered SRS resource set, the terminal can also determine a transmit beam for transmitting the SRS on the resource according to spatial relation information of the resource, where the spatial relation information is configured for each SRS resource via an RRC.

For the slot offset, if the UE receives at slot n a DCI signaling triggering an aperiodic SRS, the UE will transmit a SRS resource in a corresponding set at slot $$\left\lfloor n \cdot \frac{2^{\mu_{SRS}}}{2^{\mu_{PDCCH}}} \right\rfloor + k,$$

as illustrated in FIG. 1A, where k is an RRC parameter slotOffset configured for each set, $\mu_{SRS}$ is a subcarrier spacing (SCS) configuration for a triggering SRS carrying a trigger command, and $\mu_{PDCCH}$ is a SCS configuration for a triggering PDCCH carrying a trigger command.

Figure 1B:
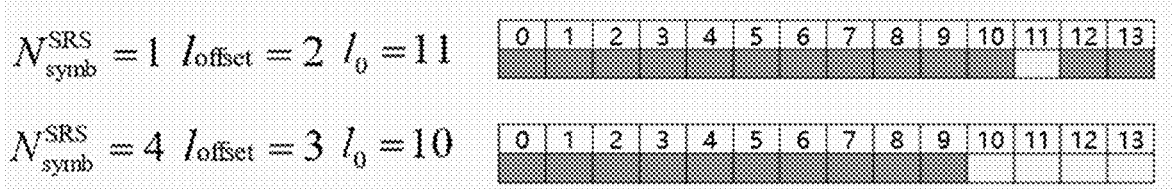
FIG. 1B is a schematic diagram illustrating time-domain resource configuration of an SRS.

2. Time-Domain Resource Configuration of an SRS startPosition INTEGER (0 . . . 13): $l_{offset} \in \{0, 1, \ldots, 13\}$; nrofSymbols ENUMERATED {n1, n2, n4}: the number (that is, quantity) of consecutive orthogonal frequency division multiplexing (OFDM) symbols $N_{symb}^{slot}$;

that is, each SRS resource can be configured in any symbol of a slot;

a time-domain start symbol of the SRS, $l_0 = N_{symb}^{slot} - 1 - l_{offset}$, i.e., counting down from the last symbol of the slot. FIG. 1B is a schematic diagram illustrating time-domain resource configuration of an SRS.

3. Frequency-Domain Configuration of an SRS Resource

The frequency-domain configuration of the SRS is determined according to parameters $C_{SRS}$ and $B_{SRS}$ (configured by an RRC signaling) in 38.211-Table 6.4.1.4.3-1, and $m_{SRS,b}$ is the number (that is, quantity) of physical resource blocks (PRB) transmitted in the SRS, where $b = B_{SRS}$.

TABLE 2

| | SRS bandwidth configuration | | | | | | | |
|---|---|---|---|---|---|---|---|---|
| | $B_{SRS} = 0$ | | $B_{SRS} = 1$ | | $B_{SRS} = 2$ | | $B_{SRS} = 3$ | |
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| ... | | | | | | | | |

A sequence length of the SRS resource is the number of occupied subcarriers and is determined according to the following formula:

$$M_{sc,b}^{SRS} = m_{SRS,b} N_{sc}^{RB} / K_{TC} \qquad \text{(formula 1)}.$$

A frequency-domain start position of the SRS resource is determined according to the following formula:

$$k_0^{(p_i)} = \bar{k}_0^{(p_i)} + \sum_{b=0}^{B_{SRS}} K_{TC} M_{sc,b}^{SRS} n_b, \qquad \text{(formula 2)}$$

where $$\bar{k}_0^{(p_i)} = n_{shift} N_{sc}^{RB} + k_{TC}^{(p_i)}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \dots, n_{SRS}^{cs,max} - 1\} \text{ and} \\ & N_{ap}^{SRS} = 4 \text{ and } p_i \in \{1001, 1003\}, \\ \bar{k}_{TC} & \text{otherwise} \end{cases}$$

$K_{TC}$ is the number of comb configurations, $N_{sc}^{RB}$ is the number of subcarriers occupied by one RB, and $n_{shift}$ is a higher layer configuration parameter.

The NR system supports SRS frequency hopping, and if $b_{hop} < B_{SRS}$ (where $b_{hop}$ is an RRC-configured parameter), the terminal transmits an SRS signal through frequency hopping. $m_{SRS,0}$ is a total bandwidth of SRS frequency hopping, and $m_{SRS,b}$ is the number of PRBs transmitted per frequency hopping. The terminal determines a frequency-domain position of each frequency hop according to the following formula:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases},$$

where $n_b$ is an index of the frequency-domain position.

$N_b$ is determined according to Table 2 above, and $n_{RRC}$ is an RRC-configured parameter, where $F_b(n_{SRS})$ is determined according to the following formula:

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \left\lfloor \dfrac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases},$$

where $N_{b_{hop}} = 1$ regardless of the value of $N_b$. $n_{SRS}$ indicates the number (in other words, count) of SRS frequency hops. For an aperiodic SRS, the number of SRS frequency hops is determined according to the following formula:

$$n_{SRS} = \lfloor l'/R \rfloor,$$

where $l' \in \{0, 1, \dots, N_{symp}^{SRS} - 1\}$, $N_{symb}^{SRS}$ is the number of consecutive OFDM symbols (which is an RRC-configured parameter), and R is a repetition factor (configured by an RRC) indicating the number of repeated OFDM symbols without frequency hopping. For example, when R=1, the frequency hopping is performed in units of one OFDM symbol, and when R=2, the frequency hopping is performed in units of two OFDM symbols.

For a periodic SRS and a half-periodic SRS, the number of SRS frequency hops is determined according to the following formula:

$$n_{SRS} = \left( \frac{N_{slot}^{frame,\mu} n_f + n_{s,f}^{\mu} - T_{offset}}{T_{SRS}} \right) \cdot \left( \frac{N_{symb}^{SRS}}{R} \right) + \left\lfloor \frac{l'}{R} \right\rfloor,$$

where $T_{SRS}$ is the configured period, $T_{offset}$ is the configured offset, $n_f$ is a serial number of a radio frame, $n_{s,f}^{\mu}$ is a serial number of a slot, and $N_{slot}^{frame,\mu}$ is the number of slots per frame.

According to configurations in current protocols, the network device configures bandwidth and frequency hopping parameters for each SRS resource. The SRS resource is transmitted in a configured bandwidth. If a frequency-domain position or a bandwidth size of a channel detected by an SRS needs to be changed at a next moment, the frequency-domain position or the bandwidth size needs to be configured via an RRC. Moreover, considering that proximity bandwidths have similar channel conditions, a cross-subband SRS is introduced to detect channels in different frequency bands, so that a larger channel bandwidth can be detected under the same condition. In addition, by adjusting configuration of parameters, partial frequency hopping can be achieved to support enhanced coverage and larger capacity.

To solve the above problems, possible solutions include flexible configuration of an SRS transmission bandwidth and cross-subband SRS transmission, both of which provide better flexibility and allow more dynamic indication of a frequency-domain position and a bandwidth size of SRS resource transmission.

The technical solutions of implementations of the disclosure are applicable to various communication systems, for example, a global system of mobile communication (GSM), a code division multiple access (CDMA) system, a wide-band code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area networks (WLAN), a wireless fidelity (Wi-Fi), a 5th-generation (5G) system, or other communication systems.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication, or vehicle to everything (V2X) communication. Implementations of the disclosure can also be applied to these communication systems.

Optionally, a communication system of implementations of the disclosure may be applied to a carrier aggregation (CA) scenario, a dual connectivity (DC) scenario, or a standalone (SA) network deployment scenario.

Optionally, the communication system of implementations of the disclosure may be applied to an unlicensed spectrum or a licensed spectrum, where the unlicensed spectrum may also be referred to as a shared spectrum, and the licensed spectrum may also be referred to as a non-shared spectrum.

Implementations of the disclosure have been described in connection with the network device and the terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device.

The terminal device may be a station (ST) in a WLAN, a cellular radio telephone, a cordless telephone, a session initiation protocol (SIP) telephone, a wireless local loop (WLL) station, a personal digital assistant (PDA), a hand-held device with wireless communication functions, a computing device, other processing devices coupled with a wireless modem, an in-vehicle device, a wearable device, and a next-generation communication system, for example, a terminal device in an NR network, a terminal device in a future evolved public land mobile network (PLMN), etc.

In implementations of the disclosure, the terminal device may be deployed on land, for example, deployed indoors or outdoors, and may be handheld, wearable, or vehicle-mounted. The terminal device may also be deployed on water, for example, on a ship, etc. The terminal device may also be deployed in the air, for example, on an airplane, an air balloon, a satellite, etc.

In implementations of the disclosure, the terminal device may be a mobile phone, a pad, a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

By way of explanation rather than limitation, according to implementations of the disclosure, the terminal device may also be a wearable device. The wearable device may also be called a wearable smart device, which is a generic term of wearable devices obtained through intelligentization designing and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

In implementations of the disclosure, the network device may be a device configured to communicate with a mobile device, and the network device may be an access point (AP) in the WLAN, a base transceiver station (BTS) in the GSM or CDMA, may also be a Node B (NB) in WCDMA, and may further be an evolutional Node B (eNB or eNodeB) in LTE, or a relay station or AP, or an in-vehicle device, a wearable device, a network device (gNB) in the NR network, a network device in the future evolved PLMN, a network device in a NTN, etc.

By way of example rather than limitation, in implementations of the disclosure, the network device may be of mobility. For example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station located on land, water, etc.

In implementations of the disclosure, the network device can provide services for a cell, and the terminal device communicates with the network device through a transmission resource (for example, a frequency-domain resource or a spectrum resource) for the cell. The cell may be a cell corresponding to the network device (for example, a base station). The cell may correspond to a macro base station, and may correspond to a base station corresponding to a small cell. The small cell may include: a metro cell, a micro cell, a pico cell, a femto cell, and the like. These small cells are characterized by small coverage and low transmission power and are adapted to provide data transmission service with high-rate.

Figure 2:
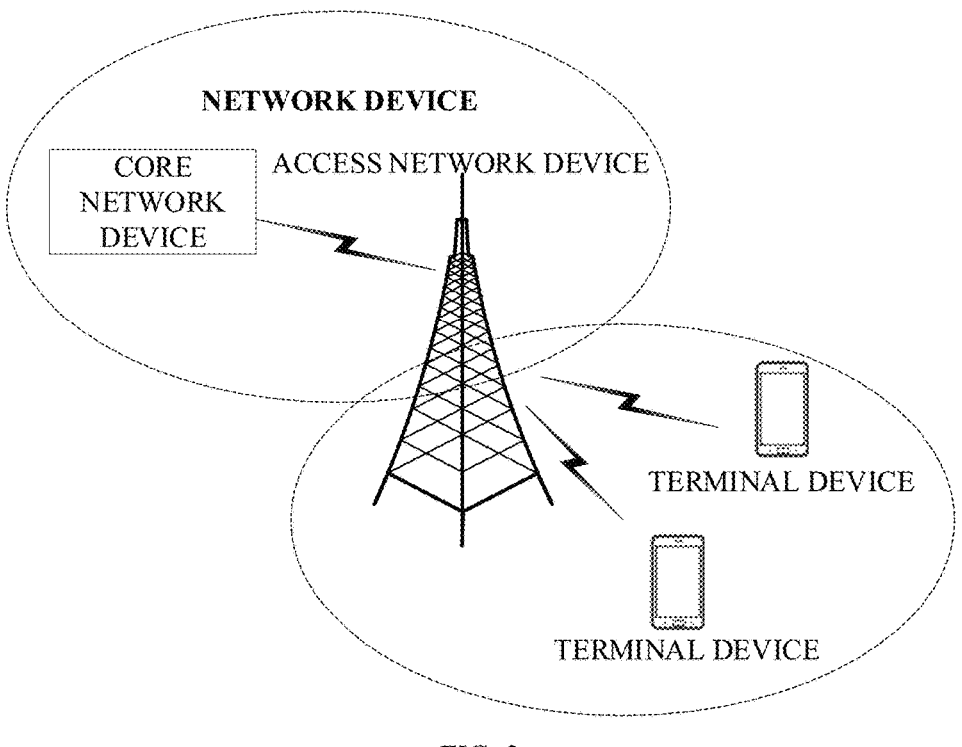
FIG. 2 is a system architecture diagram of a communication system applied in implementations of the disclosure.

FIG. 2 is a system architecture diagram of a communication system applied in implementations of the disclosure. The communication system may include a network device, and the network device may be a device that communicates with a terminal device (or referred to as communication terminal or terminal). The network device may provide communication coverage for a specific geographic area and may communicate with a terminal device located within the coverage. FIG. 2 illustrates exemplarily one network device and two terminal devices. Optionally, the communication system may include multiple network devices and there may be other numbers of terminal devices within the coverage of each network device, which is not limited herein. Optionally, the communication system may also include other network entities such as network controllers, mobile management entities, etc., which is not limited herein.

The network device may include an access network device and a core network device. That is, the wireless communication system also includes multiple core networks for communication with the access network device. The access network device may be an evolutional node B ("eNB" or "e-NodeB" for short), a macro base station, a micro base station, (also referred to as "small base station"), a pico base station, an access point (AP), a transmission point (TP), or a new generation Node B (gNodeB), and the like in an LTE system, a next generation mobile communication system, a next radio (NR) system, or an authorized auxiliary access long-term evolution (LAA-LTE LTE) system.

It should be understood that, in implementations of the disclosure, a device having a communication function in a network/system may be referred to as a communication device. Taking the communication system illustrated in FIG. 2 as an example, the communication device may include the network device and the terminal device having a communication function, and the network device and the terminal device may be the specific devices described in implementations of the disclosure, which will not be repeated herein. The communication device may also include other devices in the communication system, such as a network controller, a mobility management entity, and other network entities, which is not limited herein.

Figure 3:
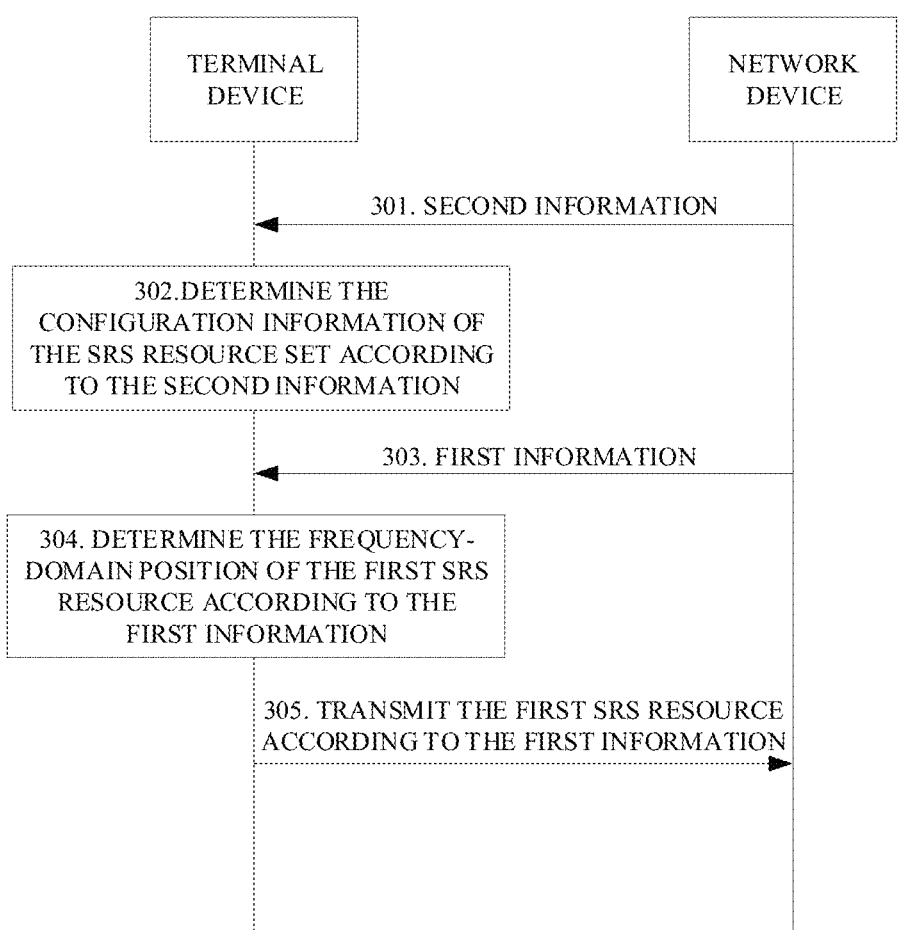
FIG. 3 is a schematic diagram of an implementation of a method for sounding reference signal (SRS) transmission resource configuration in implementations of the disclosure.

The technical solution of the disclosure is further described below in implementations. FIG. 3 is a schematic diagram of an implementation of a method for SRS transmission resource configuration in implementations of the disclosure. The method may include the following.

301. A network device transmits second information to a terminal device, where the second information contains configuration information of an SRS resource set.

Optionally, the terminal device receives the second information transmitted by the network device.

302. The terminal device determines the configuration information of the SRS resource set according to the second information.

Optionally, the SRS resource set is one or more SRS resource sets.

Optionally, each of the SRS resource sets contains one or more SRS resources.

That is, it can be understood that the network device may configure one or more SRS resource sets, and each of the SRS resource sets contains one or more SRS resources. Optionally, the SRS resource set is configured via an RRC signaling SRS-ResourceSet, and the SRS resource is configured via an RRC signaling SRS-Resource.

A field "usage" in SRS-ResourceSet is configured as one of {beamManagement, codebook, nonCodebook, antennaSwitching}. Frequency domain-related parameters are configured for SRS-Resource, where c-SRS can be configured as one of 0 to 63, b-SRS can be configured as one of 0 to 3, and b-hop can be configured as one of 0 to 3.

It should be noted that, steps 301 and 302 are optional.

303. The network device transmits first information to the terminal device, where the first information indicates a frequency-domain position of a first SRS resource.

Optionally, the terminal device receives the first information transmitted by the network device. It can be understood that the first information may dynamically indicate the frequency-domain position of the first SRS resource.

304. The terminal device determines the frequency-domain position of the first SRS resource according to the first information.

Optionally, if the network device does not transmit the first information to the terminal device, the terminal device determines a bandwidth available for SRS resource transmission according to the second information. Specifically, the terminal device determines the bandwidth available for SRS resource transmission according to c-SRS, b-SRS, and b-hop in the second information and information in 38.211-Table 6.4.1.4.3-1.

Optionally, if the network device transmits the first information to the terminal device, the terminal device determines the bandwidth available for SRS resource transmission according to the second information, the terminal device divides the bandwidth available for SRS resource transmission into S segments equally according to first indication information in the first information, where S is an integer greater than 0, and the terminal device determines a target segment among the S segments as the frequency-domain position of the first SRS resource according to second indication information in the first information.

Exemplarily, the terminal device determines which specific segment among the S segments is the frequency-domain position of the first SRS resource transmission according to the second indication information in the first information, where the specific segment is a first SRS transmission bandwidth.

Optionally, when the first information indicates the frequency-domain position of the first SRS resource, the first indication information is specified in a predefined protocol, or configured by a first field in an RRC signaling, or is a value configured in the RRC signaling and updated by a MAC CE/DCI signaling, or is a value selected through the MAC CE/DCI signaling from multiple values configured in the RRC signaling.

Exemplarily, the value of the first indication information S in the first information may be determined as follow.

(1) The value of S is specified in the predefined protocol.

(2) A field in the RRC signaling indicates to divide the bandwidth available for SRS transmission into S segments equally.

(3) The MAC CE/DCI signaling can be used to update a value S configured by the RRC signaling, or the MAC CE/DCI signaling can be used to select a value S from multiple values configured by the RRC signaling.

Optionally, when the target segment is a specific position, the second indication information is configured by a second field in an RRC signaling, or is a value configured in the RRC signaling and updated by a MAC CE/DCI signaling, or is a value selected through the MAC CE/DCI signaling from multiple values configured in the RRC signaling, where a value of the second field ranges [0, S−1].

Exemplarily, which specific segment among the S segments is the frequency-domain position of the SRS resource transmission may be determined according to the second indication information in the first information as follows.

(1) A field Y is configured in a higher layer parameter (e.g., an RRC signaling) to indicate a specific frequency-domain position. For example, the value of Y ranges [0, S−1] (in other words, the value range of Y is [0, S−1]).

(2) The MAC CE/DCI signaling can be used to update Y, or the MAC CE/DCI signaling can be used to select Y from multiple values configured by the RRC signaling.

```
SRS-Resource ::=        SEQUENCE {
   srs-ResourceId              SRS-ResourceId,
   nrofSRS-Ports              ENUMERATED {port1, ports2, ports4},
   ptrs-PortIndex             ENUMERATED {n0, n1 }
OPTIONAL,  -- Need R
   transmissionComb           CHOICE {
      n2                  SEQUENCE {
         combOffset-n2            INTEGER (0..1),
         cyclicShift-n2           INTEGER (0..7)
      },
      n4                  SEQUENCE {
         combOffset-n4            INTEGER (0..3),
         cyclicShift-n4           INTEGER (0..11)
      }
   },
   resourceMapping            SEQUENCE {
      startPosition            INTEGER (0..5),
      nrofSymbols              ENUMERATED {n1, n2, n4},
      repetitionFactor         ENUMERATED {n1, n2, n4}
   },
   freqDomainPosition         INTEGER (0..67),
   freqDomainShift            INTEGER (0..268),
   freqSegment                INTEGER (0..X), OPTIONAL
   freqIndicator              INTEGER (0..S−1), OPTIONAL
   freqHopping                SEQUENCE {
      c-SRS                    INTEGER (0..63),
      b-SRS                    INTEGER (0..3),
      b-hop                    INTEGER (0..3)
}
```

305. The terminal device transmits the first SRS resource to the network device according to the first information.

The terminal device transmits the first SRS resource to the network device according to the frequency-domain position of the first SRS resource and a bandwidth of the first SRS resource determined.

Optionally, the terminal device transmits the first SRS resource to the network device according to the first information and the second information, where the SRS resource set includes the first SRS resource.

Optionally, the method may further include the following.

(1) The terminal device determines information such as a time-domain transmission position and/or a frequency hopping parameter according to the second information.

(2) The terminal device determines a number (that is, quantity) of PRBs transmitted in the first SRS resource according to the first indication information in the first information.

Optionally, the terminal device determines $m_{SRS,b}$ according to the second information, where $m_{SRS,b}$ is a number of PRBs transmitted in an SRS resource, and the terminal device determines $m'_{SRS,b}$ according to the first indication information in the first information and $m_{SRS,b}$, where $m'_{SRS,b}$ is 1/S of $m_{SRS,b}$, and $m_{SRS,b}$ is the number of PRBs transmitted in the first SRS resource.

Exemplarily, the terminal device determines $m'_{SRS,b}$. Specifically, $m_{SRS,b}$ can be obtained from Table 2 above according to parameters c-SRS and b-SRS in the second information. Further, the terminal device obtains $m'_{SRS,b}$ through the first indication information in the first information, where $m'_{SRS,b}$ is 1/S of $m_{SRS,b}$, and $m_{SRS,b}$ is the number of PRBs transmitted in an SRS resource. For example, $m'_{SRS,b} = m_{SRS,b}/S$.

(3) The terminal device determines a number (that is, quantity) of subcarriers occupied in frequency domain according to the first indication information in the first information.

Optionally, the terminal device determines a number of subcarriers for transmitting an SRS resource according to the second information, and the terminal device determines 1/S of the number of subcarriers for transmitting the SRS resource as the number of subcarriers occupied in the frequency domain according to the first indication information in the first information. It can be understood that the number of subcarriers of the SRS resource is a sequence length of the SRS.

Exemplarily, the terminal device divides the bandwidth for SRS transmission into S segments equally according to the first indication information in the first information, then the number of subcarriers used to transmit the first SRS resource is 1/S of the original number of subcarriers, i.e., 1/S of formula 1.

For example:

$$M'_{sc,b}{}^{SRS} = m_{SRS,b} N_{sc}{}^{RB}/(K_{TC}*S), \text{ or}$$

$$M'_{sc,b}{}^{SRS} = m'_{SRS,b} N_{sc}{}^{RB}/K_{TC}.$$

(4) The terminal device determines an initial transmission position in the frequency domain according to the second indication information in the first information, where the frequency-domain position of the first SRS resource is a sum of the initial transmission position in the frequency domain and 1/S of the bandwidth available for SRS resource transmission. That is, it can be understood that 1/S of the bandwidth available for SRS resource transmission is the bandwidth for transmitting the first SRS resource.

Optionally, the terminal device determines a first SRS frequency-domain start position according to the second information, and the terminal device determines the initial transmission position in the frequency domain according to the first SRS frequency-domain start position, the number of PRBs transmitted in the first SRS resource, and the second indication information.

Exemplarily, the terminal device determines the initial transmission position in the frequency domain. After the first SRS frequency-domain start position in the second information is determined according to formula 2, a second SRS frequency-domain start position is further determined according to the second indication information in the first information. The second SRS frequency-domain start position is a start position of a second SRS transmission bandwidth. Specifically, the second SRS frequency-domain start position is the first SRS frequency-domain start position plus 1/S of $m_{SRS,b}$ multiplied by Y. S is the first indication information in the first information which indicates S segments of the bandwidth available for SRS transmission, Y is the second indication information in the first information, and the value of Y ranges [0, S−1].

For example:

$$k_0^{(pi)'} = \overline{k}_0^{(pi)} + \Sigma_{b=0}^{B_{SRS}} K_{TC} * M_{sc,b}^{SRS} * n_b + m'_{SRS,b} * Y.$$

(5) The terminal device determines whether to perform frequency hopping according to the second information.

Exemplarily, (1) if $b_{hop} \geq B_{SRS}$, frequency hopping is disabled. A frequency hopping parameter is determined according to a higher layer configuration parameter, the number of PRBs transmitted in the first SRS resource, and a predefined parameter.

For example, a transmission position in the second SRS transmission bandwidth is determined according to the following frequency-domain position index:

$n_b' = \lfloor 4m_{RRC}/m'_{SRS,b} \rfloor \mod N_b$, where $m'_{SRS,b}$ is the number of PRBs transmitted in the first SRS resource, $n_{RRC}$ is the higher layer configuration parameter, $N_b$ is the predefined parameter obtained according to Table 2 above. $b_{hop}$ is an RRC-configured parameter, and $B_{SRS}$ is an RRC-configured parameter.

(2) If $b_{hop} < B_{SRS}$, frequency hopping is enabled. The frequency hopping parameter is determined according to the higher layer configuration parameter, a frequency hopping count-related function, the number of PRBs transmitted in the first SRS resource, and the predefined parameter.

For example, the transmission position in the second SRS transmission bandwidth is determined according to the following frequency-domain position index:

$n_b' = (F_b(n_{SRS}) + \lfloor 4n_{RRC}/m'_{SRS,b} \rfloor) \mod N_b$, where $F_b(n_{SRS})$ is the frequency hopping count-related function, $n_{SRS}$ is a frequency hopping count, $m'_{SRS,b}$ is the number of PRBs transmitted in the first SRS resource, $n_{RRC}$ is the higher layer configuration parameter, and $N_b$ is the predefined parameter obtained according to Table 2 above, where divided into two segments equally, and Y indicates that the first SRS resource is transmitted on the second segment. The number of subcarriers occupied by the first SRS resource is half of the original number of subcarriers.

Optionally, the first information and the second information are transmitted via a same RRC signaling.

Optionally, the network device receives the first SRS resource transmitted by the terminal device, for example, for beam management, UL codebook channel measurement, antenna switching, or non-codebook.

In implementations of the disclosure, the terminal device receives the first information transmitted by the network device, where the first information may dynamically indicate the frequency-domain position of the first SRS resource. The terminal device determines the frequency-domain position of the first SRS resource according to the first information. The terminal device transmits the first SRS resource to the network device according to the first information. The network device can flexibly configure the frequency-domain position of the SRS resource for the terminal device. For example, the bandwidth and the frequency-domain position of the SRS resource transmission are adjusted dynamically through parameter configuration. The advantage of this solution is that there is no need to configure multiple SRS resources at different frequency-domain positions, and there is no need to frequently increase or release SRS resources. The convenience brought by the flexibility of dynamic triggering can be reasonably utilized.

Figures 4A, 4B, 5:
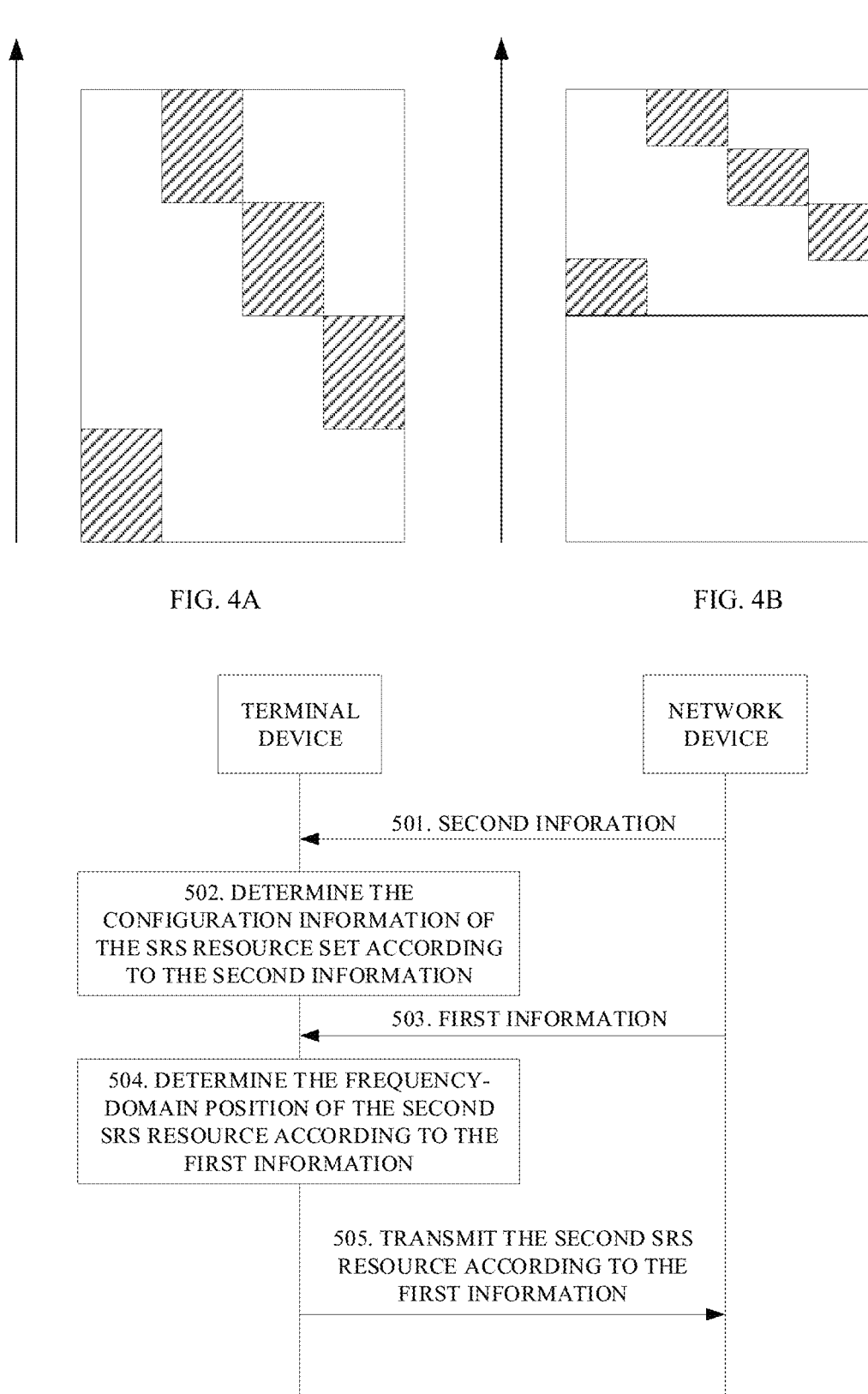
FIG. 4A is a schematic diagram illustrating a frequency-domain position of SRS resource transmission specified in an existing protocol.
FIG. 4B is a schematic diagram illustrating a frequency-domain position where a terminal device transmits an SRS resource in implementations of the disclosure.
FIG. 5 is a schematic diagram of another implementation of a method for SRS transmission resource configuration in implementations of the disclosure.

FIG. 5 is a schematic diagram of another implementation of a method for SRS transmission resource configuration in implementations of the disclosure. The method may include the following.

501. A network device transmits second information to a terminal device, where the second information contains configuration information of an SRS resource set.

502. The terminal device determines the configuration information of the SRS resource set according to the second information.

It should be noted that, steps 501 and 502 may refer to steps 301 and 302 in implementations illustrated in FIG. 3, where steps 501 and 502 are optional.

503. The network device transmits first information to the terminal device, where the first information indicates a frequency-domain position of a second SRS resource, and the second SRS resource is an SRS resource for cross-subband transmission.

Optionally, the terminal device receives the first information transmitted by the network device.

$$F_b(n_{SRS}) = \begin{cases} (N_b/2) \left[ \dfrac{n_{SRS} \bmod \prod_{b'=b_{hop}}^{b} N_{b'}}{\prod_{b'=b_{hop}}^{b-1} N_{b'}} \right] + \left[ \dfrac{n_{SRS} \bmod \prod_{b'=b_{hop}}^{b} N_{b'}}{2\prod_{b'=b_{hop}}^{b-1} N_{b'}} \right] & \text{if } N_b \text{ even} \\ \lfloor N_b/2 \rfloor \lfloor n_{SRS}/\prod_{b'=b_{hop}}^{b-1} N_{b'} \rfloor & \text{if } N_b \text{ odd} \end{cases}$$

It can be understood, for example, the terminal device is configured to enable frequency hopping. FIG. 4A is a schematic diagram illustrating a frequency-domain position of SRS resource transmission specified in an existing protocol. FIG. 4B is a schematic diagram illustrating a frequency-domain position where a terminal device transmits an SRS resource in implementations of the disclosure. As illustrated in FIG. 4B, configured S=2, and Y=1. That is, the bandwidth available for SRS resource transmission is 504. The terminal device determines the frequency-domain position of the second SRS resource according to the first information.

Optionally, if the network device does not transmit the first information to the terminal device, the terminal device determines a bandwidth available for SRS resource transmission according to the second information. Specifically, the terminal device determines the bandwidth available for SRS resource transmission according to c-SRS, b-SRS, and b-hop in the second information and information in Table 2 above.

Optionally, if the network device transmits the first information to the terminal device, the terminal device determines the bandwidth available for SRS resource transmission according to the second information, the terminal device divides the bandwidth available for SRS resource transmission into S segments equally according to first indication information in the first information, and the terminal device determines a target segment among the S segments as the frequency-domain position of the second SRS resource according to second indication information in the first information.

Optionally, when the first information indicates the frequency-domain position of the second SRS resource, and the target segment is one or more segments, the second indication information is configured by an RRC/MAC CE/DCI signaling.

(1) The terminal device divides the bandwidth available for SRS resource transmission into S segments equally according to the first indication information in the first information.

Exemplarily, the value of the first indication information S in the first information may be determined as follows.

1) A field in the RRC signaling indicates to divide the bandwidth available for SRS transmission into S segments equally.

2) The MAC CE/DCI signaling can be used to update a value S configured by the RRC signaling, or the MAC CE/DCI signaling can be used to select a value S from multiple values configured by the RRC signaling.

(2) The network device indicates the terminal device to transmit the second SRS resource on one or more segments among S bandwidth segments by configuring the second indication information M in the second information.

1) If the second indication information M is not configured, the second SRS resource can be transmitted on all band segments.

2) The value of M is determined as follows.

Manner 1: the number is obtained from the configuration information of the SRS resource set or the RRC/MAC CE/DCI signaling.

Optionally, the second indication information is configured by a third field in an RRC signaling, and a value of the third field Q ranges [0, S].

Optionally, Q indicates Q bandwidth segments selected from S bandwidth segments in ascending order or descending order in frequency domain.

Optionally, the MAC CE/DCI signaling can be used to update the number Q of bandwidth segments. Alternatively, the MAC CE/DCI signaling can be used to select the number Q of bandwidth segments from multiple values configured by the RRC signaling.

Exemplarily, a field Q is configured in a higher layer parameter (e.g., an RRC signaling) to indicate the number of bandwidth segments available for transmitting the second SRS resource by the terminal device among the S bandwidth segments, where the value of Q ranges [0, S]. Q indicates that first Q bandwidth segments selected in ascending order or descending order in the frequency domain are used to transmit the second SRS resource, where the definition of Q differs from the definition of Y in implementations above in that Q indicates the number and Y indicates the position.

Manner 2: the second indication information is used to determine, according to a bitmap sequence, corresponding S bandwidth segments and then determine positions of Q bandwidth segments for transmitting the second SRS resource among the corresponding S bandwidth segments, or the second indication information is used to determine, according to values 1 in the bitmap sequence, corresponding S bandwidth segments and then determine the positions of the Q bandwidth segments for transmitting the second SRS resource among the corresponding S bandwidth segments.

Exemplarily, the number (that is, quantity) is obtained from the bitmap sequence in the configuration information carried in the RRC/MAC CE/DCI signaling. Specifically, the terminal device determines S bandwidth segments corresponding to the bitmap sequence according to the bitmap sequence contained in the configuration information, and then determines the positions of the Q bandwidth segments for transmitting the second SRS resource. The terminal device determines bandwidth segments corresponding to positions with values 1 in the bitmap sequence as frequency band positions for transmitting the second SRS resource. For example, a first bit corresponds to a first bandwidth segment in ascending order or descending order in the frequency domain, and so on.

Mode 3: the second indication information is determined according to a predefined function, the predefined function is a function of S and Q, S is a number of bandwidth segments of an SRS resource bandwidth, and Q is a number of bandwidth segments for transmitting the second SRS resource.

Exemplarily, the number of bandwidth segments of the SRS resource is S, and the number of bandwidth segments available for transmitting the second SRS resource is Q. There is a function correspondence between S and Q, for example, Q=S/2 (if S is an odd number, a round up operation may be performed). Q indicates that first Q bandwidth segments selected in ascending order or descending order in the frequency domain are used to transmit the SRS resource.

```
SRS-Resource ::=          SEQUENCE {
    srs-ResourceId            SRS-ResourceId,
    nrofSRS-Ports             ENUMERATED {port1, ports2, ports4},
    ptrs-PortIndex            ENUMERATED {n0, n1 }          OPTIONAL,
-- Need R
    transmissionComb              CHOICE {
        n2                    SEQUENCE {
            combOffset-n2             INTEGER (0..1),
            cyclicShift-n2            INTEGER (0..7)
        },
        n4                    SEQUENCE {
            combOffset-n4             INTEGER (0..3),
            cyclicShift-n4            INTEGER (0..11)
        }
    },
```

-continued

```
    resourceMapping          SEQUENCE {
      startPosition            INTEGER (0..5),
      nrofSymbols              ENUMERATED {n1, n2, n4},
      repetitionFactor         ENUMERATED {n1, n2, n4}
    },
    freqDomainPosition           INTEGER (0..67),
  freqDomainShift            INTEGER (0..268),
  freqSegment                INTEGER (0..X), OPTIONAL-corresponding to S
  freqIndicator              INTEGER (0..S), OPTIONAL-corresponding to Q
  freBitmap                  BIT STRING (SIZE (S)), OPTIONAL-corresponding to
bitmap
    freqHopping              SEQUENCE {
      c-SRS                    INTEGER (0..63),
      b-SRS                    INTEGER (0..3),
      b-hop                    INTEGER (0..3)
    }
}
```

505. The terminal device transmits the second SRS resource to the network device according to the first information.

The terminal device transmits the second SRS resource to the network device according to the determined frequency-domain position of the second SRS resource for cross-subband transmission.

Optionally, the terminal device transmits the second SRS resource to the network device according to the first information and the second information, where the SRS resource set includes the second SRS resource.

Exemplarily, FIG. 6A is a schematic diagram illustrating positions of Q bandwidth segments indicated by a network device via a bitmap in implementations of the disclosure. FIG. 6B is a schematic diagram illustrating a frequency-domain position where a terminal device transmits an SRS resource in implementations of the disclosure. As illustrated in FIG. 6A, the network device configures S=4 for the terminal device and indicates positions of Q bandwidth segments for transmitting the second SRS resource through a bitmap "0101". The terminal device transmits the second SRS resource in a manner as illustrated in FIG. 6B.

Optionally, the first information and the second information may be transmitted via a same RRC signaling.

Optionally, the network device receives the second SRS resource transmitted by the terminal device, for example, for beam management, UL codebook channel measurement, antenna switching, or non-codebook.

In implementations of the disclosure, the terminal device receives the first information transmitted by the network device, where the first information indicates the frequency-domain position of the second SRS resource, and the second SRS resource is an SRS resource for cross-subband transmission. The terminal device determines the frequency-domain position of the second SRS resource according to the first information. The terminal device transmits the second SRS resource to the network device according to the first information. In the cross-subband transmission of the SRS, a wide range of bandwidth can be detected with a few SRSs. In this way, a requirement for quick and rough SRS detection of a wide range of channel bandwidth with a few of SRSs in special situations can be satisfied. Moreover, with flexible parameter configuration, partial frequency hopping can be achieved to enhance coverage and increase capacity. In the disclosure, the network device can flexibly indicate the bandwidth and the frequency-domain position of SRS transmission for the terminal device.

Corresponding to at least one method applied to implementations of a terminal device described above, implementations of the disclosure further provide one or more terminal devices. FIG. 7 is a schematic diagram of an implementation of a terminal device in implementations of the disclosure. The terminal device may include a transceiver module 701. The transceiver module 701 is configured to: receive first information transmitted by a network device, where the first information indicates a frequency-domain position of a first SRS resource or a frequency-domain position of a second SRS resource, and the second SRS resource is an SRS resource for cross-subband transmission; and transmit the first SRS resource or the second SRS resource to the network device according to the first information.

Optionally, the transceiver module 701 is further configured to: receive second information transmitted by the network device, where the second information includes configuration information of an SRS resource set; and transmit the first SRS resource to the network device according to the first information and the second information, where the SRS resource set includes the first SRS resource.

Optionally, the terminal device further includes a processing module 702. The processing module 702 is configured to: determine a bandwidth available for SRS resource transmission according to the second information; divide the bandwidth available for SRS resource transmission into S segments equally according to first indication information in the first information, where S is an integer greater than 0; and determine a target segment among the S segments as the frequency-domain position of the first SRS resource according to second indication information in the first information.

Optionally, when the first information indicates the frequency-domain position of the first SRS resource, the first indication information is specified in a predefined protocol, or configured by a first field in an RRC signaling, or is a value configured in the RRC signaling and updated by a MAC CE/DCI signaling, or is a value selected through the MAC CE/DCI signaling from multiple values configured in the RRC signaling.

Optionally, when the target segment is a specific position, the second indication information is configured by a second field in an RRC signaling, or is a value configured in the RRC signaling and updated by a MAC CE/DCI signaling, or is a value selected through the MAC CE/DCI signaling from multiple values configured in the RRC signaling, where a value of the second field ranges [0, S−1].

Optionally, the processing module 702 is further configured for at least one of: determining a time-domain transmission position and/or a frequency hopping parameter according to the second information; determining a number of PRBs transmitted in the first SRS resource according to the first indication information in the first information; determining a number of subcarriers occupied in frequency domain according to the first indication information in the first information; determining an initial transmission position in the frequency domain according to the second indication information in the first information, where the frequency-domain position of the first SRS resource is a sum of the initial transmission position in the frequency domain and 1/S of the bandwidth available for SRS resource transmission; and determining whether to perform frequency hopping according to the second information.

Optionally, the processing module 702 is specifically configured to: determine $m_{SRS,b}$ according to the second information, where $m_{SRS,b}$ is a number of PRBs transmitted in an SRS resource; and determine $m'_{SRS,b}$ according to the first indication information in the first information and $m_{SRS,b}$, where $m'_{SRS,b}$ is 1/S of $m'_{SRS,b}$, and $m'_{SRS,b}$ is the number of PRBs transmitted in the first SRS resource.

Optionally, the processing module 702 is specifically configured to: determine a number of subcarriers for transmitting an SRS resource according to the second information; and determine 1/S of the number of subcarriers for transmitting the SRS resource as the number of subcarriers occupied in the frequency domain according to the first indication information in the first information.

Optionally, the processing module 702 is specifically configured to: determine a first SRS frequency-domain start position according to the second information; and determine the initial transmission position in the frequency domain according to the first SRS frequency-domain start position, the number of PRBs transmitted in the first SRS resource, and the second indication information.

Optionally, the processing module 702 is specifically configured to: disable frequency hopping if $b_{hop} \geq B_{SRS}$, and determine a frequency hopping parameter according to a higher layer configuration parameter, the number of PRBs transmitted in the first SRS resource, and a predefined parameter; and enable frequency hopping if $b_{hop} < B_{SRS}$, and determine the frequency hopping parameter according to the higher layer configuration parameter, a frequency hopping count-related function, the number of PRBs transmitted in the first SRS resource, and the predefined parameter, where $b_{hop}$ is an RRC-configured parameter, and $B_{SRS}$ is an RRC-configured parameter.

Optionally, when the first information indicates the frequency-domain position of the second SRS resource, and the target segment is one or more segments, the second indication information is configured by an RRC/MAC CE/DCI signaling.

Optionally, the second indication information is configured by a third field in an RRC signaling, and a value of the third field Q ranges [0, S].

Optionally, the second indication information is determined according to a predefined function, the predefined function is a function of S and Q, S is a number of bandwidth segments of an SRS resource bandwidth, and Q is a number of bandwidth segments for transmitting the second SRS resource.

Optionally, Q indicates Q bandwidth segments selected from S bandwidth segments in ascending order or descending order in frequency domain.

Optionally, the second indication information is used to determine, according to a bitmap sequence, corresponding S bandwidth segments and then determine positions of Q bandwidth segments for transmitting the second SRS resource among the corresponding S bandwidth segments, or the second indication information is used to determine, according to values 1 in the bitmap sequence, corresponding S bandwidth segments and then determine the positions of the Q bandwidth segments for transmitting the second SRS resource among the corresponding S bandwidth segments.

Optionally, the first information and the second information are transmitted via a same RRC signaling.

Optionally, the SRS resource set is one or more SRS resource sets, and each of the SRS resource sets contains one or more SRS resources.

Corresponding to at least one method applied to implementations of a network device described above, implementations of the disclosure further provide one or more network devices. FIG. 8 is a schematic diagram of an implementation of a network device in implementations of the disclosure. The network device may include a transceiver module 801. The transceiver module 801 is configured to: transmit first information to a terminal device, where the first information indicates a frequency-domain position of a first SRS resource or a frequency-domain position of a second SRS resource, and the second SRS resource is an SRS resource for cross-subband transmission; and receive the first SRS resource or the second SRS resource transmitted by the terminal device according to the first information.

Optionally, the transceiver module 801 is further configured to: transmit second information to the terminal device, where the second information includes configuration information of an SRS resource set; and receive the first SRS resource transmitted by the terminal device according to the first information and the second information, where the SRS resource set includes the first SRS resource.

Optionally, the second information is used for the terminal device to determine a bandwidth available for SRS resource transmission according to the second information; first indication information in the first information is used for the terminal device to divide the bandwidth available for SRS resource transmission into S segments equally, where S is an integer greater than 0; and second indication information in the first information is used for the terminal device to determine a target segment among the S segments as the frequency-domain position of the first SRS resource.

Optionally, when the first information indicates the frequency-domain position of the first SRS resource, the first indication information is specified in a predefined protocol, or configured by a first field in an RRC signaling, or is a value configured in the RRC signaling and updated by a MAC CE/DCI signaling, or is a value selected through the MAC CE/DCI signaling from multiple values configured in the RRC signaling.

Optionally, when the target segment is a specific position, the second indication information is configured by a second field in an RRC signaling, or is a value configured in the RRC signaling and updated by a MAC CE/DCI signaling, or is a value selected through the MAC CE/DCI signaling from multiple values configured in the RRC signaling, where a value of the second field ranges [0, S−1].

Optionally, when the first information indicates the frequency-domain position of the second SRS resource, and the target segment is one or more segments, the second indication information is configured by an RRC/MAC CE/DCI signaling.

Optionally, the second indication information is configured by a third field in an RRC signaling, and a value of the third field Q ranges [0, S].

Optionally, the second indication information is determined according to a predefined function, the predefined function is a function of S and Q, S is a number of bandwidth segments of an SRS resource bandwidth, and Q is a number of bandwidth segments for transmitting the second SRS resource.

Optionally, Q indicates Q bandwidth segments selected from S bandwidth segments in ascending order or descending order in frequency domain.

Optionally, the second indication information is used to determine, according to a bitmap sequence, corresponding S bandwidth segments and then determine positions of Q bandwidth segments for transmitting the second SRS resource among the corresponding S bandwidth segments, or the second indication information is used to determine, according to values 1 in the bitmap sequence, corresponding S bandwidth segments and then determine the positions of the Q bandwidth segments for transmitting the second SRS resource among the corresponding S bandwidth segments.

Optionally, the first information and the second information are transmitted via a same RRC signaling.

Optionally, the SRS resource set is one or more SRS resource sets, and each of the SRS resource sets contains one or more SRS resources.

Optionally, the network device further includes a processing module 802. The processing module 802 is configured perform beam management, UL codebook channel measurement, antenna switching, or non-codebook according to the second SRS resource.

Figure 9:
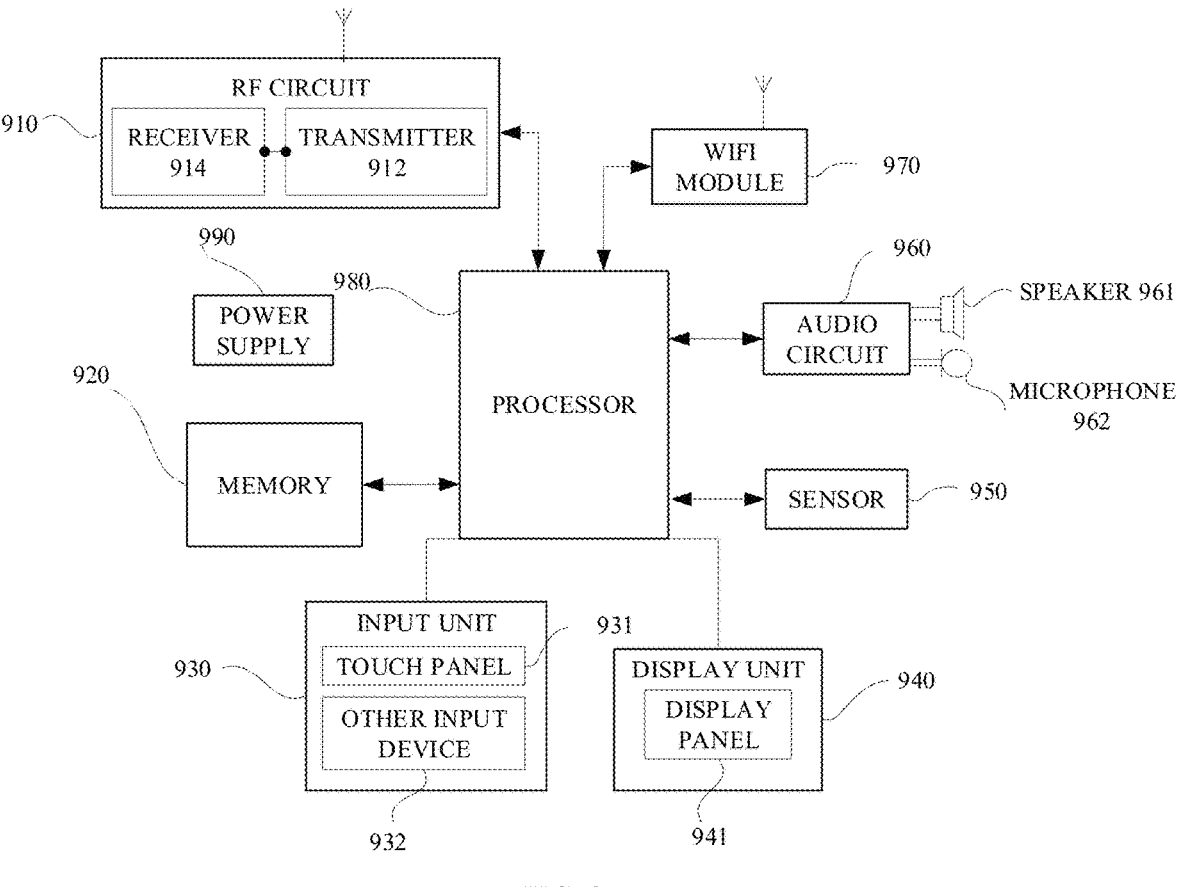
FIG. 9 is a schematic diagram of another implementation of a terminal device in implementations of the disclosure.

Corresponding to at least one method applied to implementations of a terminal device described above, implementations of the disclosure further provide one or more terminal devices. The terminal device of implementations of the disclosure can implement any implementation of the method described above. FIG. 9 is a schematic diagram of another implementation of a terminal device in implementations of the disclosure. For illustration purposes, the terminal device is, for example, a mobile phone and may include components such as a radio frequency (RF) circuit 910, a memory 920, an input unit 930, a display unit 940, a sensor 950, an audio circuit 960, a wireless fidelity (Wi-Fi) module 970, a processor 980, a power supply 990, and the like. The RF circuit 910 includes a receiver 914 and a transmitter 912. It will be understood by those skilled in the art that the structure of the mobile phone illustrated in FIG. 9 does not constitute a limitation of the mobile phone, and may include more or fewer components than illustrated, or may combine certain components, or may have different component arrangements.

The respective components of the mobile phone will be described in detail below with reference to FIG. 9.

The RF circuit 910 may be configured to receive and transmit signals during transmitting and receiving messages or calls. In particular, after DL information is received from the base station, the DL information is provided to the processor 980 for processing. In addition, UL data is transmitted to the base station. Generally, the RF circuit 910 includes, but is not limited to, an antenna, at least one amplifier, a transceiver, a coupler, a low noise amplifier (LNA), a duplexer, etc. In addition, the RF circuit 910 may also communicate with the network and other devices via wireless communication. The wireless communication above may use any communication standard or protocol, including, but not limited to, global system of mobile communication (GSM), general packet radio service (GPRS), code division multiple access (CDMA), wideband code division multiple access (WCDMA), long term evolution (LTE), e-mail, short messaging service (SMS), etc.

The memory 920 may be configured to store software programs and modules, and the processor 980 executes various functional applications of the mobile phone as well as data processing by running the software programs and modules stored in the memory 920. The memory 920 may mainly include a storage program area and a storage data area, where the storage program area may store an operating system, an application required for at least one function, such as sound playback function, image playback function, etc. The storage data area may store data created according to the use of the mobile phone, such as audio data, phone book, etc. In addition, the memory 920 may include a high-speed random-access memory (RAM), and may also include a non-volatile memory, such as at least one disk memory device, flash memory device, or other volatile solid state memory device.

The input unit 930 may be configured to receive input digital or character information and generate key signal inputs related to user settings and function control of the mobile phone. Specifically, the input unit 930 may include a touch panel 931 and other input devices 932. The touch panel 931, which is also referred to as a touch screen, may collect touch operations of a user on or near the touch panel 931 (such as an operation of the user with a finger, a stylus, or any other suitable object or accessory on or near the touch panel 931) and drive a corresponding connection device according to a predetermined program. Optionally, the touch panel 931 may include a touch detection device and a touch controller. The touch detection device is configured to detect a touch orientation of the user and a signal brought by the touch operation, and to transmit the signal to the touch controller. The touch controller is configured to receive touch information from the touch detection device, convert the touch information into contact coordinates, and transmit the contact coordinates to the processor 980, and receive and execute commands from the processor 980. In addition, the touch panel 931 may be implemented in various types such as resistive, capacitive, infrared, and surface acoustic waves. In addition to the touch panel 931, the input unit 930 may also include other input devices 932. Specifically, the other input devices 932 may include, but are not limited to, one or more of a physical key, a function key (e.g., a volume control key, a switch key, etc.), a trackball, a mouse, a joystick, etc.

The display unit 940 may be configured to display information input by or provided to the user and various menus of the mobile phone. The display unit 940 may include a display panel 941. Optionally, the display panel 941 may be configured in the form of a liquid crystal display (LCD), an organic light-emitting diode (OLED), etc. Further, the touch panel 931 may cover the display panel 941. When the touch panel 931 detects a touch operation on or near the touch panel 931, the touch operation is transmitted to processor 980 to determine the type of touch event, and them the processor 980 provides a corresponding visual output on the display panel 941 according to the type of the touch event. Although the touch panel 931 and the display panel 941 are illustrated as two separate components in FIG. 9 to implement the input and input functions of the mobile phone, in some implementations, the touch panel 931 may be integrated with the display panel 941 to implement the input and output functions of the mobile phone.

The mobile phone may also include at least one sensor 950, such as a light sensor, a motion sensor, and other sensors. Specifically, the light sensor may include an ambient light sensor and a proximity sensor. The ambient light sensor is configured to adjust the brightness of the display panel 941 according to ambient lights, and the proximity sensor is configured to turn off the display panel 941 and/or the backlight when the mobile phone reaches nearby the ear. As a motion sensor, the accelerometer sensor is configured to detect the magnitude of acceleration in all directions (generally three axes), and when the mobile phone is stationary, the accelerometer sensor is configured to detect the magnitude and direction of gravity. The accelerometer sensor can be used for mobile phone-gesture recognition-related applications (such as vertical-horizontal screen switch, related games, magnetometer attitude calibration), or for vibration-recognition related functions (such as a pedometer, percussion), etc. The mobile phone can also be configured with a gyroscope, a barometer, a hygrometer, a thermometer, an infrared sensor, and other sensors, which will not repeat herein.

The audio circuit 960, a speaker 961, and a microphone 962 may provide an audio interface between the user and the mobile phone. The audio circuit 960 is configured to convert the received audio data into electrical signals and transmit the electrical signals to the speaker 961. The speaker 961 is configured to convert the electrical signals into sound signals for output. On the other hand, the microphone 962 is configured to convert the collected sound signals into electrical signals. The audio circuit 960 is configured to receive and convert the electrical signals into audio data for output. The processor 980 is configured to process the audio data and then transmit the audio data processed via the RF circuit 910 to another mobile phone for example, or the audio data is output to the memory 920 for further processing.

Wi-Fi relates to a short-range wireless transmission technology. With a Wi-Fi module 970, the mobile phone may assist the user in e-mail transmitting and receiving, webpage browsing, access to streaming media, etc. Wi-Fi provides users with wireless broadband internet access. Although the Wi-Fi module 970 is illustrated in FIG. 9, it should be understood that the Wi-Fi module 970 is not essential to the mobile phone and can be omitted according to actual needs without departing from the essential nature of the disclosure.

The processor 980 is a control center of the mobile phone. Various interfaces and lines are configured to connect various parts of the while mobile phone. The mobile phone is monitored via running or executing software programs and/or modules stored in the memory 920 and invoking data stored in the memory 920 to perform various functions of the mobile phone and process data. Optionally, the processor 980 may include one or more processing units. For example, in the processor 980, an application processor may be integrated with a modem processor. The application processor is mainly configured to manage the operating system, the user interface, the applications, etc. The modem processor is mainly configured for wireless communications. It will be appreciated that the modem processor may not be integrated into the processor 980.

The mobile phone also includes the power supply 990 (e.g., a battery) configured to supply power to various components. In implementations, the power supply may be logically coupled with the processor 980 via a power management system to enable management of charging, discharging, and power consumption through the power management system.

Although not illustrated, the mobile phone may also include a camera, a Bluetooth module, etc., which will not be described herein.

In implementations of the disclosure, the RF circuit 910 is configured to: receive first information transmitted by a network device, where the first information indicates a frequency-domain position of a first SRS resource or a frequency-domain position of a second SRS resource, and the second SRS resource is an SRS resource for cross-subband transmission; and transmit the first SRS resource or the second SRS resource to the network device according to the first information.

Optionally, the RF circuit 910 is further configured to: receive second information transmitted by the network device, where the second information includes configuration information of an SRS resource set; and transmit the first SRS resource to the network device according to the first information and the second information, where the SRS resource set includes the first SRS resource.

Optionally, the terminal device further includes the processor 980 configured to: determine a bandwidth available for SRS resource transmission according to the second information; divide the bandwidth available for SRS resource transmission into S segments equally according to first indication information in the first information, where S is an integer greater than 0; and determine a target segment among the S segments as the frequency-domain position of the first SRS resource according to second indication information in the first information.

Optionally, when the first information indicates the frequency-domain position of the first SRS resource, the first indication information is specified in a predefined protocol, or configured by a first field in an RRC signaling, or is a value configured in the RRC signaling and updated by a MAC CE/DCI signaling, or is a value selected through the MAC CE/DCI signaling from multiple values configured in the RRC signaling.

Optionally, when the target segment is a specific position, the second indication information is configured by a second field in an RRC signaling, or is a value configured in the RRC signaling and updated by a MAC CE/DCI signaling, or is a value selected through the MAC CE/DCI signaling from multiple values configured in the RRC signaling, where a value of the second field ranges [0, S−1].

Optionally, the processor 980 is further configured for at least one of: determining a time-domain transmission position and/or a frequency hopping parameter according to the second information; determining a number of PRBs transmitted in the first SRS resource according to the first indication information in the first information; determining a number of subcarriers occupied in frequency domain according to the first indication information in the first information; determining an initial transmission position in the frequency domain according to the second indication information in the first information, where the frequency-domain position of the first SRS resource is a sum of the initial transmission position in the frequency domain and 1/S of the bandwidth available for SRS resource transmission; and determining whether to perform frequency hopping according to the second information.

Optionally, the processor 980 is specifically configured to: determine $m_{SRS,b}$ according to the second information, where $m_{SRS,b}$ is a number of PRBs transmitted in an SRS resource; and determine $m'_{SRS,b}$ according to the first indication information in the first information and $m_{SRS,b}$, where $m'_{SRS,b}$ is 1/S of $m_{SRS,b}$, and $m'_{SRS,b}$ is the number of PRBs transmitted in the first SRS resource.

Optionally, the processor 980 is specifically configured to: determine a number of subcarriers for transmitting an SRS resource according to the second information; and determine 1/S of the number of subcarriers for transmitting the SRS resource as the number of subcarriers occupied in the frequency domain according to the first indication information in the first information.

Optionally, the processor 980 is specifically configured to: determine a first SRS frequency-domain start position according to the second information; and determine the initial transmission position in the frequency domain according to the first SRS frequency-domain start position, the number of PRBs transmitted in the first SRS resource, and the second indication information.

Optionally, the processor 980 is specifically configured to: disable frequency hopping if $b_{hop} \geq B_{SRS}$, and determine a frequency hopping parameter according to a higher layer configuration parameter, the number of PRBs transmitted in the first SRS resource, and a predefined parameter; and enable frequency hopping if $b_{hop} < B_{SRS}$, and determine the frequency hopping parameter according to the higher layer configuration parameter, a frequency hopping count-related function, the number of PRBs transmitted in the first SRS resource, and the predefined parameter, where $b_{hop}$ is an RRC-configured parameter, and $B_{SRS}$ is an RRC-configured parameter.

Optionally, when the first information indicates the frequency-domain position of the second SRS resource, and the target segment is one or more segments, the second indication information is configured by an RRC/MAC CE/DCI signaling.

Optionally, the second indication information is configured by a third field in an RRC signaling, and a value of the third field Q ranges [0, S].

Optionally, the second indication information is determined according to a predefined function, the predefined function is a function of S and Q, S is a number of bandwidth segments of an SRS resource bandwidth, and Q is a number of bandwidth segments for transmitting the second SRS resource.

Optionally, Q indicates Q bandwidth segments selected from S bandwidth segments in ascending order or descending order in frequency domain.

Optionally, the second indication information is used to determine, according to a bitmap sequence, corresponding S bandwidth segments and then determine positions of Q bandwidth segments for transmitting the second SRS resource among the corresponding S bandwidth segments, or the second indication information is used to determine, according to values 1 in the bitmap sequence, corresponding S bandwidth segments and then determine the positions of the Q bandwidth segments for transmitting the second SRS resource among the corresponding S bandwidth segments.

Optionally, the first information and the second information are transmitted via a same RRC signaling.

Optionally, the SRS resource set is one or more SRS resource sets, and each of the SRS resource sets contains one or more SRS resources.

Figure 10:
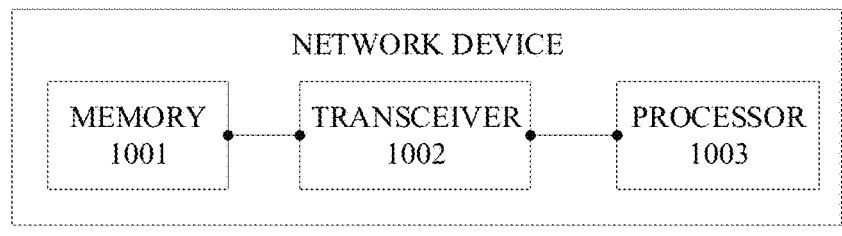
FIG. 10 is a schematic diagram of another implementation of a network device in implementations of the disclosure.

Corresponding to at least one method applied to implementations of a network device described above, implementations of the disclosure further provide one or more network devices. FIG. 10 is a schematic diagram of another implementation of a network device in implementations of the disclosure. The network device may include a memory 1001 configured to store executable program codes, a transceiver 1002 coupled with the memory 1001, and a processor 1003. The transceiver 1002 is configured to: transmit first information to a terminal device, the first information indicates a frequency-domain position of a first SRS resource or a frequency-domain position of a second SRS resource, and the second SRS resource is an SRS resource for cross-subband transmission; and receive the first SRS resource or the second SRS resource transmitted by the terminal device according to the first information.

Optionally, the transceiver 1002 is further configured to: transmit second information to the terminal device, where the second information includes configuration information of an SRS resource set; and receive the first SRS resource transmitted by the terminal device according to the first information and the second information, where the SRS resource set includes the first SRS resource.

Optionally, the second information is used for the terminal device to determine a bandwidth available for SRS resource transmission according to the second information; first indication information in the first information is used for the terminal device to divide the bandwidth available for SRS resource transmission into S segments equally, where S is an integer greater than 0; and second indication information in the first information is used for the terminal device to determine a target segment among the S segments as the frequency-domain position of the first SRS resource.

Optionally, when the first information indicates the frequency-domain position of the first SRS resource, the first indication information is specified in a predefined protocol, or configured by a first field in an RRC signaling, or is a value configured in the RRC signaling and updated by a MAC CE/DCI signaling, or is a value selected through the MAC CE/DCI signaling from multiple values configured in the RRC signaling.

Optionally, when the target segment is a specific position, the second indication information is configured by a second field in an RRC signaling, or is a value configured in the RRC signaling and updated by a MAC CE/DCI signaling, or is a value selected through the MAC CE/DCI signaling from multiple values configured in the RRC signaling, where a value of the second field ranges [0, S−1].

Optionally, when the first information indicates the frequency-domain position of the second SRS resource, and the target segment is one or more segments, the second indication information is configured by an RRC/MAC CE/DCI signaling.

Optionally, the second indication information is configured by a third field in an RRC signaling, and a value of the third field Q ranges [0, S].

Optionally, the second indication information is determined according to a predefined function, the predefined function is a function of S and Q, S is a number of bandwidth segments of an SRS resource bandwidth, and Q is a number of bandwidth segments for transmitting the second SRS resource.

Optionally, Q indicates Q bandwidth segments selected from S bandwidth segments in ascending order or descending order in frequency domain.

Optionally, the second indication information is used to determine, according to a bitmap sequence, corresponding S bandwidth segments and then determine positions of Q bandwidth segments for transmitting the second SRS resource among the corresponding S bandwidth segments, or the second indication information is used to determine, according to values 1 in the bitmap sequence, corresponding S bandwidth segments and then determine the positions of the Q bandwidth segments for transmitting the second SRS resource among the corresponding S bandwidth segments.

Optionally, the first information and the second information are transmitted via a same RRC signaling.

Optionally, the SRS resource set is one or more SRS resource sets, and each of the SRS resource sets contains one or more SRS resources.

Optionally, the network device further includes the processor 1003 configured to: perform beam management, UL codebook channel measurement, antenna switching, or non-codebook according to the second SRS resource.

The functions in implementations described above may be implemented in whole or in part through software, hardware, firmware, or any combination thereof. When implemented through software, the functions may be implemented in whole or in part in a form of a computer program product. The computer program product includes one or more computer instructions.

When the computer program instructions are loaded and executed on a computer, processes or functions are generated in whole or in part according to implementations of the disclosure. The computer may be a general-purpose computer, a special purpose computer, a computer network, or another programmable apparatus. The computer instructions may be stored in a computer-readable storage medium, or may be transmitted from one computer-readable storage medium to another computer-readable storage medium. For example, the computer instructions may be transmitted from a website site, a computer, a server, or a data center to another website site, computer, server, or data center through a wired mode (e.g., a coaxial cable, an optical fiber, and a digital subscriber line (DSL)) or a wireless mode (e.g., infrared radiation, radio, and microwave.). The computer-readable storage medium may be any available medium which a computer may access to, or a data storage device such as a server or data center that includes one or more available media integrated therein. The available medium may be a magnetic medium (e.g., a floppy disk, a hard disk, and a magnetic tape), an optical medium (e.g., a digital video disc (DVD)), or a semiconductor medium (e.g., a solid state disk (SSD)), or the like.

The terms "first", "second", "third", and "fourth" (if present) in the specification, claims, and drawings of the disclosure are used to distinguish similar objects, but not to describe a specific order. It should be understood that data so used is interchangeable where appropriate so that implementations described herein can be implemented in an order other than illustrated or described herein. In addition, the terms "including", "comprising", "having", and any variations thereof are intended to cover non-exclusive inclusions. For example, a process, a method, a system, a product, or a device involving a series of steps or units is not necessarily limited to those steps or units explicitly listed, but may include steps or units not explicitly listed or other steps or units inherent to the process, the method, the product, or the device.

What is claimed is:

1. A method for sounding reference signal (SRS) transmission resource configuration, comprising:

receiving, by a terminal device, second information transmitted by a network device, wherein the second information comprises configuration information of an SRS resource set;

receiving, by the terminal device, first information transmitted by the network device, the first information indicating a frequency-domain position of a first SRS resource;

determining, by the terminal device, a bandwidth available for SRS resource transmission according to the second information;

dividing, by the terminal device, the bandwidth available for SRS resource transmission into S segments equally according to first indication information in the first information, wherein S is an integer greater than 0;

determining, by the terminal device, a target segment among the S segments as the frequency-domain position of the first SRS resource according to second indication information in the first information; and transmitting, by the terminal device, the first SRS resource to the network device according to the first information and the second information, wherein the SRS resource set comprises the first SRS resource;

wherein when the first information indicates the frequency-domain position of the first SRS resource, the first indication information is configured by a first field in a radio resource control (RRC) signaling; and wherein when the target segment is a specific position, the second indication information is configured by a second field in an RRC signaling, wherein a value of the second field ranges [0, S−1].

2. The method of claim 1, further comprising at least one of:

determining, by the terminal device, a time-domain transmission position and/or a frequency hopping parameter according to the second information;

determining, by the terminal device, a number of physical resource blocks (PRB) transmitted in the first SRS resource according to the first indication information in the first information;

determining, by the terminal device, a number of subcarriers occupied in frequency domain according to the first indication information in the first information;

determining, by the terminal device, an initial transmission position in the frequency domain according to the second indication information in the first information, wherein the frequency-domain position of the first SRS resource is a sum of the initial transmission position in the frequency domain and 1/S of the bandwidth available for SRS resource transmission; and determining, by the terminal device, whether to perform frequency hopping according to the second information.

3. The method of claim 2, wherein determining, by the terminal device, the number of PRBs transmitted in the first SRS resource according to the first indication information in the first information comprises:

determining, by the terminal device, $m_{SRS,b}$ according to the second information, wherein $m_{SRS,b}$ is a number of PRBs transmitted in an SRS resource; and determining, by the terminal device, $m'_{SRS,b}$ according to the first indication information in the first information and $M_{SRS,b}$, wherein $m'_{SRS,b}$ is 1/S of $m_{SRS,b}$, and $m'_{SRS,b}$ is the number of PRBs transmitted in the first SRS resource.

4. The method of claim 2, wherein determining, by the terminal device, the number of subcarriers occupied in the frequency domain according to the first indication information in the first information comprises:

determining, by the terminal device, a number of subcarriers for transmitting an SRS resource according to the second information; and determining, by the terminal device, 1/S of the number of subcarriers for transmitting the SRS resource as the number of subcarriers occupied in the frequency domain according to the first indication information in the first information.

5. A terminal device, comprising:

a memory configured to store executable program codes;

a processor configured to execute the executable program codes stored in the memory to cause the terminal device to:

receive second information transmitted by a network device, wherein the second information comprises configuration information of an SRS resource set;

receive first information transmitted by the network device, the first information indicating a frequency-domain position of a first sounding reference signal (SRS) resource;

determine a bandwidth available for SRS resource transmission according to the second information;

divide the bandwidth available for SRS resource transmission into S segments equally according to first indication information in the first information, wherein S is an integer greater than 0;

determine a target segment among the S segments as the frequency-domain position of the first SRS resource according to second indication information in the first information; and transmit the first SRS resource to the network device according to the first information and the second information, wherein the SRS resource set comprises the first SRS resource;

wherein when the first information indicates the frequency-domain position of the first SRS resource, the first indication information is configured by a first field in a radio resource control (RRC) signaling; and wherein when the target segment is a specific position, the second indication information is configured by a second field in an RRC signaling, wherein a value of the second field ranges [0, S−1].

6. The terminal device of claim 5, wherein the processor is further configured for at least one of:

determining a time-domain transmission position and/or a frequency hopping parameter according to the second information;

determining a number of physical resource blocks (PRB) transmitted in the first SRS resource according to the first indication information in the first information;

determining a number of subcarriers occupied in frequency domain according to the first indication information in the first information;

determining an initial transmission position in the frequency domain according to the second indication information in the first information, wherein the frequency-domain position of the first SRS resource is a sum of the initial transmission position in the frequency domain and 1/S of the bandwidth available for SRS resource transmission; and determining whether to perform frequency hopping according to the second information.

7. The terminal device of claim 6, wherein the processor is specifically configured to:

determine $m_{SRS,b}$ according to the second information, wherein $m_{SRS,b}$ is a number of PRBs transmitted in an SRS resource; and determine $m'_{SRS,b}$ according to the first indication information in the first information and $m_{SRS,b}$, wherein $m'_{SRS,b}$ is 1/S of $m_{SRS,b}$, and $m'_{SRS,b}$ is the number of PRBs transmitted in the first SRS resource.

8. The terminal device of claim 6, wherein the processor is specifically configured to:

determine a number of subcarriers for transmitting an SRS resource according to the second information; and determine 1/S of the number of subcarriers for transmitting the SRS resource as the number of subcarriers occupied in the frequency domain according to the first indication information in the first information.

9. A network device, comprising:

a memory configured to store executable program codes;

a processor configured to execute the executable program codes stored in the memory to cause the terminal device to:

transmit second information to a terminal device, wherein the second information comprises configuration information of an SRS resource set;

transmit first information to the terminal device, the first information indicating a frequency-domain position of a first sounding reference signal (SRS) resource;

wherein the second information is used for the terminal device to determine a bandwidth available for SRS resource transmission;

wherein first indication information in the first information is used for the terminal device to divide the bandwidth available for SRS resource transmission into S segments equally, wherein S is an integer greater than 0; and wherein second indication information in the first information is used for the terminal device to determine a target segment among the S segments as the frequency-domain position of the first SRS resource; and receive the first SRS resource transmitted by the terminal device according to the first information and the second information, wherein the SRS resource set comprises the first SRS resource;

wherein when the first information indicates the frequency-domain position of the first SRS resource, the first indication information is configured by a first field in a radio resource control (RRC) signaling; and wherein when the target segment is a specific position, the second indication information is configured by a second field in an RRC signaling, wherein a value of the second field ranges [0, S−1].

* * * * *